United States Patent [19]

Chen

[11] Patent Number: 4,868,369

[45] Date of Patent: Sep. 19, 1989

[54] SOLDERING IRON STAND HAVING AN AUTOMATICALLY ACTUATED NOXIOUS FUME REMOVAL ARRANGEMENT

[76] Inventor: Shu-Mu Chen, 5 Fl., No. 19, Hoping Street, San Chung City, Taiwan

[21] Appl. No.: 49,957

[22] Filed: May 22, 1987

[51] Int. Cl.$^4$ .......................... B23K 3/04; F21V 33/00; H05B 1/02; B01D 46/00

[52] U.S. Cl. ................ 219/242; 55/DIG. 18; 55/385.1; 98/115.4; 219/137.41; 219/220; 219/360; 219/361; 228/57; 362/253

[58] Field of Search ............... 219/242, 361, 220, 360, 219/137.41; 362/216, 253; 55/385 R, 385 G, DIG. 18; 228/51–55, 57, 19, 20; 98/115.4

[56] References Cited

U.S. PATENT DOCUMENTS

| | | | |
|---|---|---|---|
| 2,543,103 | 2/1951 | Friesen | 219/242 |
| 3,294,348 | 12/1966 | Cerisano | 219/242 X |
| 3,430,551 | 3/1969 | Hauville | 98/115.4 |
| 3,510,228 | 5/1970 | May | 362/216 X |
| 3,890,126 | 6/1975 | Joseph | 362/253 X |
| 4,092,136 | 5/1978 | Zimbardi | 55/385 R |
| 4,109,144 | 8/1978 | Vidmar | 55/385 R |
| 4,268,282 | 5/1981 | MacKenzie | 55/DIG. 18 |
| 4,456,816 | 6/1984 | Fortune | 219/242 |
| 4,662,022 | 5/1987 | Vogler | 228/57 X |

FOREIGN PATENT DOCUMENTS

| | | | |
|---|---|---|---|
| 3004434 | 9/1981 | Fed. Rep. of Germany | 55/385 G |
| 3301253 | 7/1984 | Fed. Rep. of Germany | 219/361 |
| 816749 | 5/1937 | France | 219/242 |
| 133414 | 1/1979 | German Democratic Rep. | 219/242 |
| 267334 | 6/1950 | Switzerland | 55/385 R |
| 656553 | 7/1986 | Switzerland | 55/385 R |

*Primary Examiner*—Anthony Bartis
*Attorney, Agent, or Firm*—Browdy and Neimark

[57] ABSTRACT

A solder assembly for facilitating soldering operations includes a stand having a pivotally mounted soldering iron rack for receiving and supporting a soldering iron plugged into a power outlet socket on the stand during periods of non-use. The soldering iron rack is arranged to operate a switch upon withdrawal of the soldering iron from the rack for use to activate a motor driven fan housed in a hood supported above the stand by an articulated member on the stand. The fan upwardly sucks the noxious gases produced by the soldering process through an activated charcoal filter positioned an a trumpet-shaped air passage defined by the hood for discharge through a nozzle rotatably and angularly adjustably mounted in the exhaust outlet port of the hood. A lamp manually energized by a separate switch is provided in the hood to illuminate the work area. A sponge pad and a solder reel support strut are provided on the stand. A manual switch on the stand permits operation of the fan with the soldering iron positioned in the rack.

20 Claims, 4 Drawing Sheets

SOLDERING IRON STAND HAVING AN AUTOMATICALLY ACTUATED NOXIOUS FUME REMOVAL ARRANGEMENT

BACKGROUND OF THE INVENTION

In conventional executions a typical solder assembly for solder operations consists of a stand on which a soldering iron rack must be placed for solder operations. Such executions have been found to be inconvenient, in general, with certain shortcomings discussed below.

In practice, concurrent with welding and soldering, because of the interaction of the soldering iron with the weld rod, the solder wire, and the flux, large amounts of noxious gases may be released and inhaled by the operators, who can be affected and often stricken unconscious by being poisoned. One previous primitive solution has been to provide a fan to blow off the noxious gases, which results only in dispersion of the gases which then permeate throughout the entire work space, and causes difficulty in bringing the soldering iron temperature up to the desired working point.

In addition, the prior art assemblies do not permit lighting facilities for incorporation therein, the illumination being accomplished by a desk lamp disposed close by the stand, or else by fluorescent lamps provided at the job site. This arrangement easily results either in work pieces colliding with one another and eventually falling, thereby destroying the desk lamp, or else in the power supply wires for the lamps intertwining with each other, thereby causing nuisances and inconveniences to the operators at work.

Furthermore, in the arrangement where the soldering iron rack is not correlated in a fixed layout with respect to the solder wire or weld rod, it is often found that the soldering iron rack has been displaced elsewhere or that the solder wire is misplaced. The time required for searching for the tools is wasted, causing the work efficiency to be lowered.

Finally, the dispersal of the noxious gases by an electric fan is carried out without any antipollution treatment such that the noxious gases in fact linger and permeate throughout the working compound, and constitute a menace to the health of all the operators in the compound.

In view of all the shortcomings and disadvantages of conventional soldering assemblies recited above and as a result of years of experience and exposure in the job, the inventor betook himself to the search for corrections thereof and has developed the soldering assembly according to the present invention which eliminates all the known defects of conventional executions by virtue of the safety and utility features realized hereunder.

SUMMARY OF THE INVENTION

The primary object of the present invention is to provide for the structure of a soldering assembly having a trumpetshaped air entry passage provided in a hood. Downstream and on the interior of the passage, an L-shaped panel is provided on which an activated carbon, filter having a stop bumper thereon is secured in place. A nozzle mechanism is provided upstream from an air blower complete with a in-laid rabbet having one side above the other side, for retaining the nozzle mechanism upward towards an enclosing rim which forms a flange around the central penetration hole of the hood. A sectorlike exhaust outlet port on the nozzle is upwardly projected thereby which is available for rotation in 360 degrees pitched upwardly or downwardly, as required.

A further object of the present invention is to provide for the structure of a soldering assembly wherein a control lever is fitted extending down from the soldering iron rack mounted upon a stand, so that handling of the soldering iron, in particular withdrawing the iron for use or replacing the iron in position, will actuate a microswitch housed in a frame underneath the stand. This in turn activates the motor and the fan associated with the hood of the soldering assembly to the on or off position accordingly, when a mode switch on the assembly is set to the "automatic" position.

According to one embodiment of the present invention, solder assembly includes a stand including a power outlet socket for plugging in an electric soldering iron. The stand has a first penetration hole therethrough and an upwardly extending rear member having a passage hole therein. A soldering iron rack is provided for holding the soldering iron; the rack includes a two-piece forward rod and a two-piece rear rod extending downwardly from an undersurface of said rack. Each of the rods include a passage hole and the rear rod is pivotally connected to the rear member by a first pivot shaft which extends through the passage holes in the rear rod and the passage hole in the rear member. A control lever is disposed under the stand having a lower portion and an upper portion extending freely through the first penetration hole. The control lever comprises a stop means and a retention spring, and includes a passage hole through the upper portion and is connected to the two-piece forward rod via a second pivot shaft which passes through the passage hole in the forward rod and the passage hole in the control lever. A U-shaped frame extends below the stand for retaining the lower portion of the control lever and the retention spring. The retention spring is disposed around the control lever lower portion and has one end in contact with the stop means and another end in contact with the U-shaped frame. The U-shaped frame comprises a second penetration hole provided on a bottom side thereof. A microswitch is disposed under the U-shaped frame having a central spindle passing through the second passage hole so as to come into contact with the lower portion of the control lever and an articulated bracing limb is pivotally connected to the stand. A semi-circular U-shaped fastener is provided on a free end of the bracing limb including passage holes provided on terminal ends thereof and a hood having an underside processed to yield a trumpet-like air intake passage is provided. The hood has two fixing mounts on an outside surface thereof for attaching the hood to the fastener by inserting screws through the passage holes on the ends of the fastener and through the fixing mounts. Protrusions are positioned symmetrically with respect to one another inside the hood and an annular member is inserted in the hood disposed on the protrusions. At least two lamp supports are provided in the hood above the annular member having an arcuated underside portion adapted to receive a lamp and a streamlined upper portion connected to the hood. Three symmetrically positioned L-shaped first brackets are provided on the protrusions and an activated charcoal filter is coupled to the first brackets. The filter includes a stop means provided on one side thereof for fitting to the hood to secure the filter in position. Four struts, including passage holes therein, are disposed at a predetermined position within the hood and a motor including passage holes on an underside thereof is provided for connection to the passage holes of the struts by screws passing through the respective passage holes. The motor is electrically connected to the microswitch. A centrifugal fan is connected to a central shaft of the motor via a screw. Means defining an air outlet passage hole is provided centrally on a top portion of the hood including enclosing rims on an underside thereof and a nozzle mechanism is rotatably clamped by the enclosing rims within the means defining an air outlet passage hole so as to rotate 360° upwardly or downwardly pitched. A rabbet provides a flange on the nozzle mechanism having one end tipped above an opposite end and a sector-like air exhaust outlet port is provided on one side of the nozzle mechanism. An L-shaped solder wire holder is connected to the stand and three L-shaped second brackets are positioned on the stand for receiving a sponge pad therein. A first switch controls the lamp and a second switch is electrically connected in series with the microswitch and the motor for controlling the motor and the fan.

BRIEF DESCRIPTION OF THE DRAWINGS

Other features and advantages of the present invention will emerge from the following descriptions of the embodiments given by way of illustration, but not in any way limiting, with reference to the accompanying drawings, in which.

DETAILED DESCRIPTION

Figure 1:
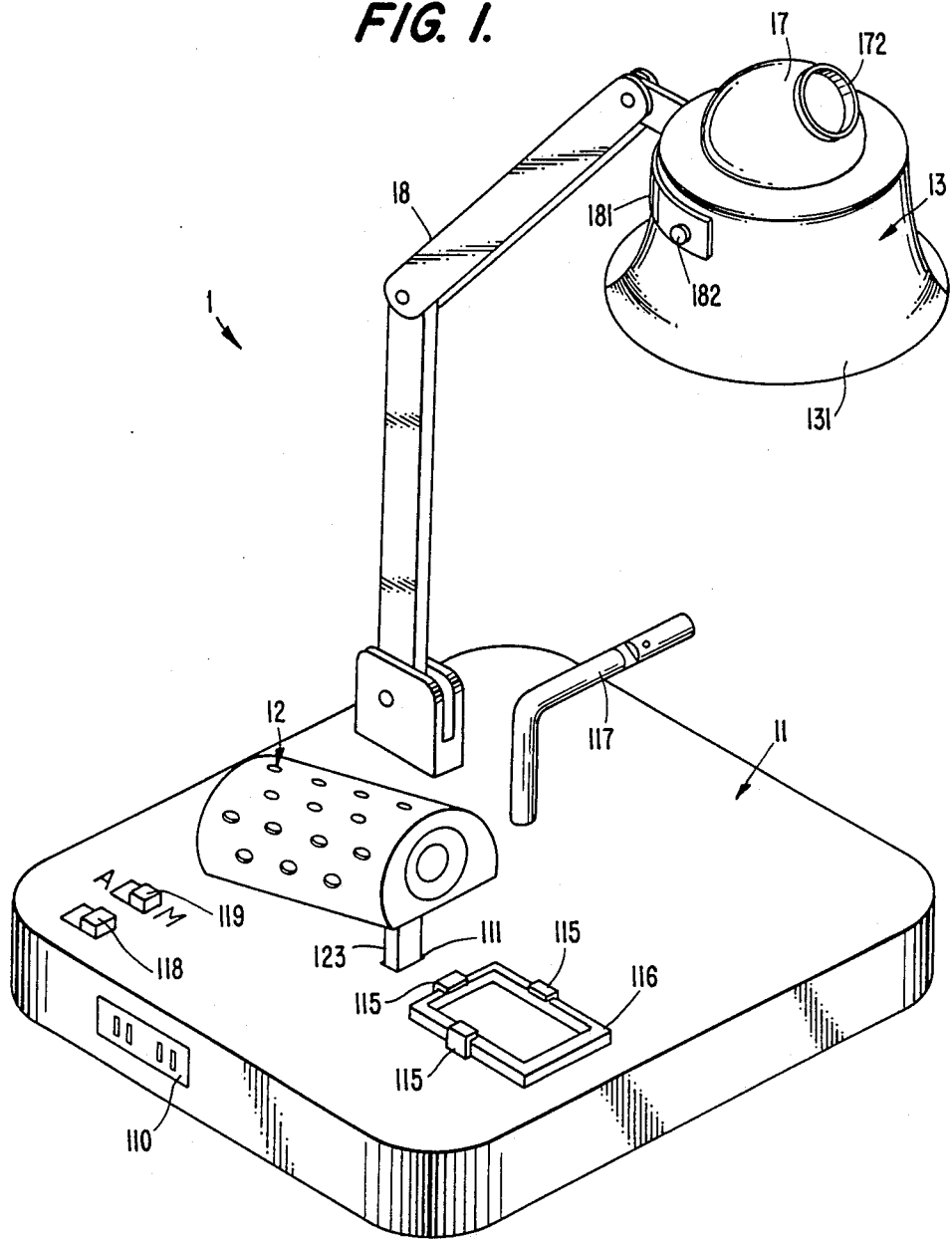
FIG. 1 is a three-dimensional profile view of the present invention.
Figure 2:
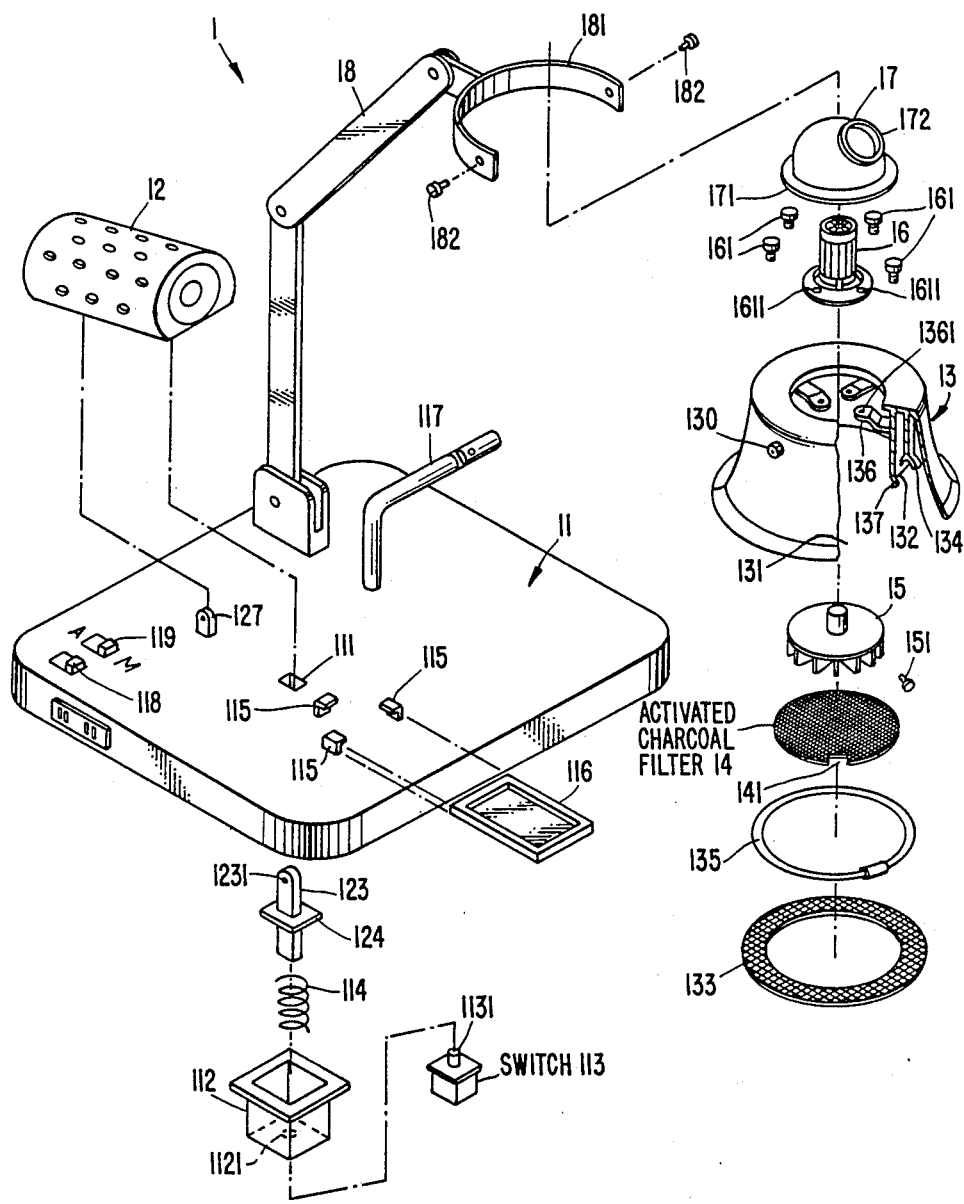
FIG. 2 is an exploded perspective of all essential parts constituting the invention.
Figure 3A:
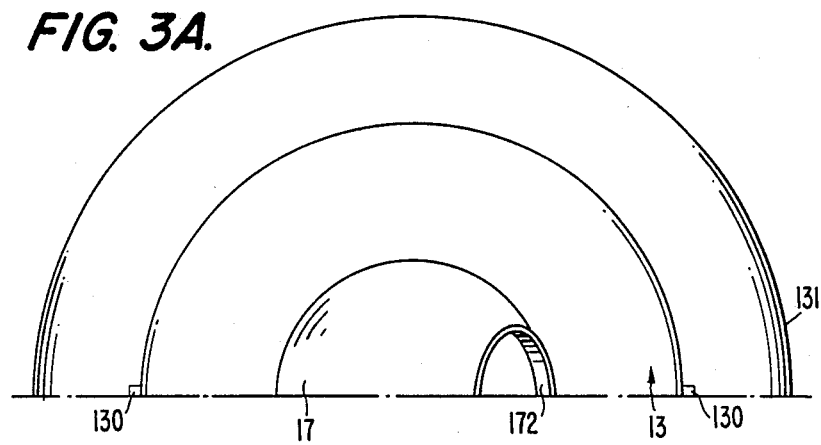
FIG. 3A is a partial top plan view of the hood according to the present invention.
Figure 3B:
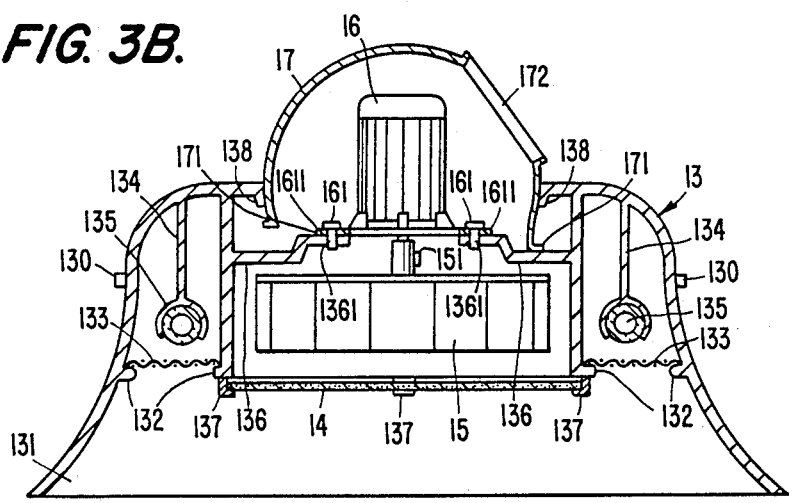
FIG. 3B is a sectional view of the hood which is part of the invention.
Figure 3C:
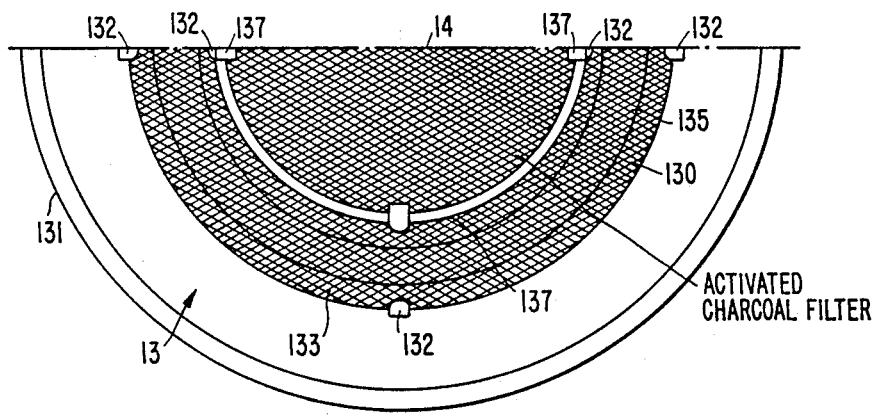
FIG. 3C is a partial bottom plan view of the hood according to the present invention.
Figure 4:
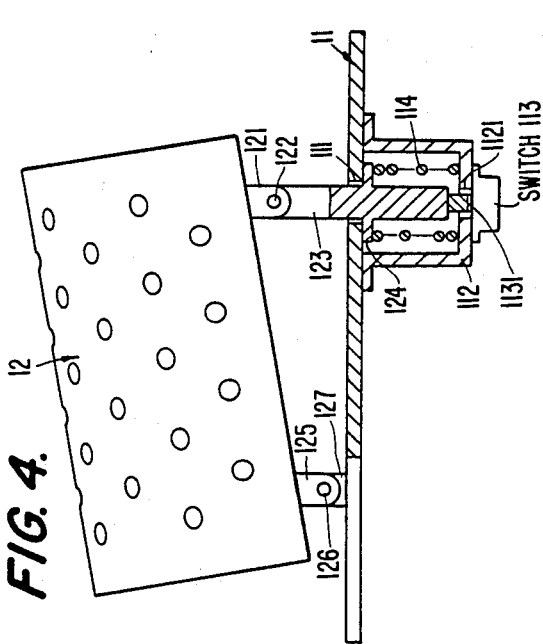
FIG. 4 is an illustration of the soldering iron rack.

Referring to FIGS. 1 and 2, it is seen that the device 1 according to the present invention is composed essentially of a stand 11, a soldering iron rack 12, a hood 13, a filter 14, and an articulated support 18. The upper terminal of the articulated support 18 is processed into a semi-circular U-shaped fastener 181. The free ends thereof are each provided with screwholes to facilitate fastening using screws 182. The screws are used to fasten the fixing mounts 130 for the hood 13 to the fastener 181. On the left side of the stand 11 a poWer outlet socket 110 for plugging in the soldering iron 120 is provided. A penetration hole 111 is provided on the stand 11 towards the front thereof. As indicated in FIG. 4, underneath the penetration hole 111 are provided, in order, a U-shaped frame 112 and a microswitch 113 which is to be actuated by a control lever 123 and penetrates out from hole 1121 at the bottom of the U-shaped frame 112. In assembly, a retention spring 114 is mounted inside the U-shaped frame 112, on which is fitted control lever 123 Which incorporates a stop means 124. The upper end of the control leVer 123, in the form of a rectangular stem 1131, is left exposed on the stand 11. The upperside is provided with passage holes 1231 on the ends thereof to accommodate a forward lever 121 on the front end of the soldering iron rack 12 formed in two pieces and having passage holes (not shown) thereon. Forward lever 121 is connected to control lever 123 by means of a pivot 122 inserted into the respective passage holes. On the rear end of the soldering iron rack 12 is fitted a rear rod 125 Which also executed in two pieces and includes passage holes therein. This rear rod 125 is connected to rear mount chassis member 127 present on stand 11 via respective passage holes provided in rod 125 and chassis 127 with the aid of pivot 126.

Figure 5:
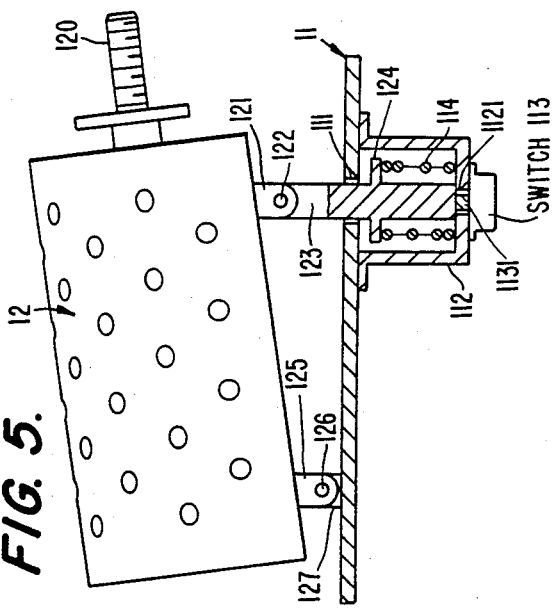
FIG. 5 is a further illustration of the soldering iron rack with a soldering iron inserted therein.

Referring to FIG. 5, an illustration of the invention is shown under circumstances where the soldering iron 120 remains in rack 12 when not in active use. In this case, the microswitch 113 is kept constantly open, that is, in an off condition, because of the pressure brought to bear upon control lever 123 and the retention spring 114 exerted by the soldering iron 120 because of its weight, from its relative position higher above. As the soldering iron 120 is later withdrawn for use, the soldering iron rack 12 is relieved of the stress bearing thereupon theretofore, and the retention spring 114 confined in the U-shaped frame 112 will, in the meantime, thrust the stop means 124 that is part of the control lever 123 upwardly. Thus the microswitch 113 is converted to a constant closed status from the constant open status which had prevailed theretofore. Henceforth motor 16 and blower 15 are actuated. In the meanwhile the switch 119 on the stand is set to the "automatic" position, the circuitry and operation modes to be described hereinafter.

Referring to FIGS. 3A, 3B, and 3C, FIG. 4, and FIG. 5 it is shown that the underside of the hood 13 is processed to yield a trumpetshaped air passage 131, which serves to bring into being a swirled air stream because of rotation of the blower 15, whereby noxious gases produced as the soldering operation takes place may be fully sucked in. In the midst of the exterior of the hood 13 are provided in projection two fixing mounts 130 having screwholes fitted centrally thereto, so as to facilitate attachment with the articulated means 18 by screws 182 and holes present on both ends of the aforementioned U-shaped fastener 181. Four protrusions 132 are provided in contraposition centrally inside the hood 13 serving to engage with annularly shaped fluorescent lamp grilles or screens 133. Lamp supports 134 extend on the interior of hood 13 and have spherical undersides and rod-shaped upper sides whereby lamps 135 may be introduced for illumination. The switch 118 for the lamps 135 is mounted on the stand 11, as shown on the leftmost corner of FIG. 1, so that the lamps may be turned on or off just by manipulating the switch 118 in the forward or in the reverse direction as per the user's discretion.

The interior of the hood 13 delineated by the two interior protrusions 132 provided symmetrically with respect to one another is a cylindrical space having four struts 136 oriented centrally at a reference point about two thirds of the distance from projections 132 thereof. On the periphery of each strut, passage holes 1361 are provided for fixing to the board passage holes 1611 on the underside of the motor 16 by means of screw 161. The underside of the central shaft of motor 16 is embodied with a centrifugal fan 15 by means of screw 151, so that as motor 16 is set to rotate the fan 15 will be rotated in synchronism therewith. Inside the hood 13 which incorporates the protrusions 132, below the underside of fan 15 and connected to the free ends of protrusions 132, are provided three L-shaped brackets 137 which can accommodate the insertion of a circular filter 14 having casette activated carbon elements within. Such a filter 14 serves to absorb noxious substances and has a stop means 141 provided on one side thereof for fitting upon the hood 13 to secure the filter in position.

On the top of hood 13 at a central position, a round hole is provided which is flanged by curved enclosing rim 138 along the interior side, so as to facilitate the insertion of a spherical nozzle mechanism 17. This spherical nozzle mechanism 17 is flanged by rabbets 171 oriented such that the rabbet on one side of the nozzle mechanism is above the rabbet on the opposite side. On a declined slope on one side thereof is mounted a sector-like exhaust outlet port 172, so that the nozzle mechanism 17, clamped in by the enclosing rim 138 relative to the hood 13, may be freely, adjustably rotated through 360 degrees pitched upwardly or downwardly, so that the gas exhaust may be discharged in any direction as per the operator's choice.

Figure 6:
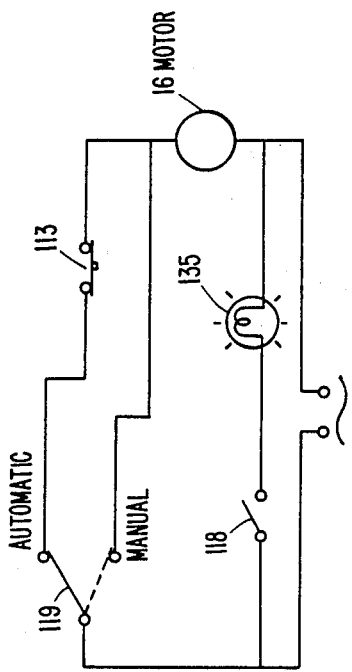
FIG. 6 is a circuit schematic of the invention.

Referring to FIG. 6, which is a circuitry schematic of the invention, it is clear that by manipulation or depression of switch 118, the lamps 135 established in the hood 13 will light up forthwith. When switch 119 is manipulated to the "automatic" position, the withdrawal of soldering iron 120 from the soldering iron rack 12 as shown in FIG. 4, will cause the microswitch 113 to be actuated (on), Whereupon fan 15 and motor 16 Will rotate until the soldering iron 120 is deposited upon the soldering iron rack 12, as shown in FIG. 5. At that time, the microswitch 113 will open (off) at once, thereby rendering fan 15 and motor 16 inoperative. If the user wishes to run both the fan and motor notwithstanding the placement of the soldering iron in the rack, he will only have to set the switch 119 manually to the "manual" position. Then motor 16 and fan 15 will keep running regardless of the status of the microswitch 113, active or passive.

The air stream prevailing as a result of motor 16 and fan 15 being activated, will produce a strong air flow as a result of the action of intake passage 131 located at a lower portion of the hood 13. This air floW is strong enough to suck in the noxious gases produced concurrent with a soldering operation in progress for filtration by an active carbon filter 14 provided midway, and eventually feed the gases to sector-like exhaust outlet port 172 on the upper end of the nozzle mechanism 17 by way of strut 136 for discharge.

There are three L-shaped brackets provided upon the stand 11 and positioned in front of the solder iron rack 12, which serve as the base for a sponge pad 116 meant for the scrubbing of soldering iron 120. To the right thereof an L-shaped solder wire holder 117 is provided, which receives a reel upon which solder wire or weld rod may be wound in a coil to facilitate the use thereof by providing a fixed setting to avoid possible misplacements. The activated charcoal filter 14 permits easy and convenient withdrawal for replacement in both safe and idealistic manner. The trumpet shaped air passage 131 with strong air flow will suck in the noxious gases produced as the soldering operation is performed. The provision of the sector-like exhaust outlet port 172 out of the hood 13 may be embodied in other ways with a view to discharge air exhaust in any orientation preferred relative to the soldering workshop, so that all the noxious gases produced in the course of the soldering operation can be removed outdoors. The arrangement to embody such elements as the flexible, articulate arm 18, the automatic mode switch 119, on-off lamp switch 118, and switch 113 and their associated functions, all together on a master chassis along with a fluorescent lamp, solder wire rack 117, soldering iron rack 12, sponge pad 116, and fan 15 effectively improves utility performance.

I claim:
1. A solder assembly comprising:
 a stand including a power outlet socket for plugging in an electric soldering iron and having a first penetration hole therethrough and an upwardly extending rear member having a passage hole therein;
 a soldering iron rack for holding the soldering iron, said rack including a two-piece forward rod and a two-piece rear rod extending downwardly from an undersurface of said rack, each of said rods including a passage hole, said rear rod being pivotally connected to said rear member by a first pivot shaft which extends through the passage holes in the rear rod and the passage hole in the rear member;
 a control lever disposed under said stand and having a lower portion and an upper portion extending freely through the first penetration hole, said control lever comprising a stop means and a retention spring, said control lever including a passage hole through the upper portion and connected to the two-piece forward rod via a second pivot shaft which passes through the passage hole in the forward rod and the passage hole in said control lever;
 a U-shaped frame extending below said stand for retaining the lower portion of said control lever and the retention spring, the retention spring being disposed around said control lever lower portion and having one end in contact with said stop means and another end in contact with said U-shaped frame, said U-shaped frame comprising a second penetration hole provided on a bottom side thereof;
 a microswitch disposed under said U-shaped frame having a central spindle passing through said second passage hole so as to come into contact with the lower portion of said control lever;
 An articulated bracing limb pivotally connected to said stand;
 a semi-circular U-shaped fastener provided on a free end of said bracing limb including passage holes provided on terminal ends thereof;
 a hood having an underside processed to yield a trumpet-like air intake passage, said hood having two fixing mounts on an outside surface thereof for attaching said hood to said fastener by inserting screws through the passage holes on the ends of the fastener and through the fixing mounts;
 protrusions positioned symmetrically with respect to one another inside said hood;
 an annular member inserted in said hood and disposed on said protrusions;
 at least two lamp supports provided in said hood above said annular member, said lamp supports having an arcuated underside portion adapted to receive a lamp and streamlined upper portion connected to said hood;
 three symmetrically positioned L-shaped first brackets provided on said protrusions;
 an activated charcoal filter coupled to said first brackets, said filter including a stop means provided on one side thereof for fitting to said hood to secure said filter in position;

four struts, including passage holes therein, disposed at a predetermined position within said hood;

a motor including passage holes on an underside thereof for connection to the passage holes of said struts by screws passing through the respective passage holes, said motor being electrically connected to said microswitch;

a centrifugal fan connected to a central shaft of said motor via a screw;

means defining an air outlet passage hole provided centrally on a top portion of said hood including enclosing rims on an underside thereof;

a nozzle mechanism rotatably clamped by the enclosing rims within said means defining an air outlet passage hole so as to rotate 360° upwardly or downwardly pitched;

a rabbet providing a flange on said nozzle mechanism having one end tipped above an opposite end;

a sector-like air exhaust outlet port provided on one side of said nozzle mechanism;

an L-shaped solder wire holder connected to said stand;

three L-shaped second brackets positioned on said stand for receiving a sponge pad therein;

a first switch for controlling the lamp; and a second switch electrically connected in series with said microswitch and said motor for controlling said motor and said fan.

2. The solder assembly according to claim 1, wherein the lamp is manually controlled by said first switch, and said motor and said fan are automatically controlled by said second switch, such that when a soldering iron is placed in said rack, said control lever actuates said microswitch to open and turn off said motor and said fan and when the soldering iron is removed from the rack, said control lever actuates said microswitch to close and turn on said motor and said fan.

3. The solder assembly according to claim 1, wherein said first and second switches are manually controlled.

4. A solder assembly comprising:
a stand having a power outlet socket for plugging in an electric soldering iron and a first penetration hole;

a soldering iron rack for holding the soldering iron, said rack having a first end pivotally connected to said stand;

a control lever disposed under said stand and having a lower portion and an upper portion extending through the first penetration hole and operatively connected to the other end of said rack, said control lever comprising a spring for upwardly biasing the control lever and the soldering rack and stop means for limiting upward movement of said control lever;

a microswitch disposed under said stand so as to come into contact with the lower portion of said control lever;

a hood having an underside shaped to yield a trumpet-like air intake passage, said hood having fixing mounts on an outside surface thereof;

an articulated bracing limb pivotally connected to said stand comprising fastener means connected to said fixing mounts of said hood for attaching said hood to said bracing limb;

at least two lamp supports connected inside said hood for supporting a lamp;

an activated charcoal filter disposed within said hood;

a centrifugal fan disposed within said hood;

a motor disposed within said hood having a central shaft connected to said fan for operating said fan, said motor being connected in series with said microswitch;

means defining an air outlet passage hole provided centrally on a top portion of said hood;

a nozzle mechanism rotatably disposed within said means defining an air outlet passage hole so as to rotate 360° upwardly or downwardly pitched;

an air exhaust outlet port provided on one side of said nozzle mechanism through which air is blown by said fan;

a first switch provided on said stand electrically connected to the lamp for controlling the lamp; and a second switch provided on said stand electrically connected in series with said motor and said microswitch for controlling said motor and said fan.

5. The solder assembly according to claim 4, wherein the lamp is manually controlled by said first switch, and said motor and said fan are manually controlled by said second switch, and further comprising means for operatively connecting said microswitch to said rack such that when a soldering iron is placed in said rack with said second switch closed, said control lever automatically actuates said microswitch to open and turn off said motor and said fan and when the soldering iron is removed from the rack, said control lever automatically actuates said microswitch to close and turn on said motor and said fan.

6. The solder assembly according to claim 5, further comprising an L-shaped solder wire holder connected to said stand and three L-shaped first brackets positioned on said stand for receiving a sponge pad therein.

7. The solder assembly according to claim 6, further comprising a U-shaped frame extending below said stand for retaining said control lever, said frame including a penetration hole on a lower surface thereof for receiving a central spindle of said microswitch so as to connect said microswitch to said control lever.

8. The solder assembly according to claim 7, wherein said fastener means comprises a semi-circular U-shaped fastener provided on a free end of said bracing limb.

9. The solder assembly according to claim 8, further comprising protrusions positioned symmetrically with respect to one another inside said hood and an annular member inserted in said hood disposed on said protrusions below said lamp supports.

10. The solder assembly according to claim 9, further comprising three symmetrically positioned L-shaped second brackets provided on said protrusions for connecting said activated charcoal filter to said hood.

11. The solder assembly according to claim 10, further comprising four struts, including passage holes therein, disposed at a predetermined position within said hood, said motor including passage holes on an underside thereof for connection to the passage holes of said struts by screws passing through the respective passage holes.

12. The solder assembly according to claim 11, further comprising a rabbet providing a flange on said nozzle mechanism having one end tipped above an opposite end for securing said nozzle mechanism within said means defining an air outlet passage hole.

13. The solder assembly according to claim 4, wherein the lamps, said motor and said fan are manually controlled by the respective first and second switches.

14. The solder assembly according to claim 13, further comprising an L-shaped solder are wire holder connected to said stand and three L-shaped first brackets positioned on said stand for receiving a sponge pad therein.

15. The solder assembly according to claim 14, further comprising a U-shaped frame extending below said stand for retaining said control lever, said frame including a penetration hole on a lower surface thereof for receiving a central spindle of said microswitch so as to connect said microswitch to said control lever.

16. The solder assembly according to claim 15, wherein said fastener means comprises a semi-circular U-shaped fastener provided on a free end of said bracing limb.

17. The solder assembly according to claim 16, further comprising protrusions positioned symmetrically with respect to one another inside said hood and an annular screen inserted in said hood disposed on said protrusions below said lamp supports.

18. The solder assembly according to claim 17, further comprising three symmetrically positioned L-shaped second brackets provided on said protrusions for connecting said activated charcoal filter to said hood.

19. The solder assembly according to claim 18, further comprising four struts, including passage holes therein, disposed at a predetermined position within said hood, said motor including passage holes on an underside thereof for connection to the passage holes of said struts by screws passing through the respective passage holes.

20. The solder assembly according to claim 19, further comprising a rabbet providing a flange on said nozzle mechanism having one end tipped above an opposite end for securing said nozzle mechanism within said means defining an air outlet passage hole.

* * * * *